United States Patent
Bantz et al.

(10) Patent No.: US 7,313,691 B2
(45) Date of Patent: Dec. 25, 2007

(54) INTERNET SITE AUTHENTICATION SERVICE

(75) Inventors: David F. Bantz, Portland, ME (US); Thomas E. Chefalas, Somers, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/716,037

(22) Filed: Nov. 18, 2003

(65) Prior Publication Data

US 2005/0108569 A1 May 19, 2005

(51) Int. Cl.
| | |
|---|---|
| H04L 9/00 | (2006.01) |
| G06F 11/00 | (2006.01) |
| G06F 12/14 | (2006.01) |
| G06F 12/16 | (2006.01) |
| G06F 15/18 | (2006.01) |
| G08B 23/00 | (2006.01) |

(52) U.S. Cl. .................... 713/155; 726/22; 726/23; 726/25; 713/162

(58) Field of Classification Search ............... 713/155, 713/162
See application file for complete search history.

(56) References Cited

U.S. PATENT DOCUMENTS

| 5,717,756 | A | | 2/1998 | Coleman |
| 5,953,424 | A | | 9/1999 | Vogelsang |
| 6,014,698 | A | * | 1/2000 | Griffiths ..................... 709/224 |
| 6,085,224 | A | * | 7/2000 | Wagner ...................... 709/203 |
| 6,745,333 | B1 | * | 6/2004 | Thomsen ..................... 726/23 |
| 7,072,944 | B2 | * | 7/2006 | Lalonde et al. ............. 709/206 |
| 7,114,177 | B2 | * | 9/2006 | Rosenberg et al. ............ 726/4 |
| 2003/0097591 | A1 | * | 5/2003 | Pham et al. ................. 713/201 |
| 2003/0188194 | A1 | * | 10/2003 | Currie et al. ............... 713/201 |
| 2004/0123157 | A1 | * | 6/2004 | Alagna et al. .............. 713/201 |

* cited by examiner

Primary Examiner—Benjamin E. Lanier
(74) Attorney, Agent, or Firm—Scully, Scott, Murphy & Presser, P.C.; Lisa Yamonaco, Esq.

(57) ABSTRACT

The authenticity of a website is tested with software that runs on a personal computing device and a service that is provided via the Internet. The software on the personal computing device is in the form of a proxy, or transparent component in the Internet Protocol implementation. The proxy receives all outbound messages, analyzes them and forwards or modifies them without the user's intervention. The service tests the IP address and/or the behavior of the target website.

22 Claims, 3 Drawing Sheets

INTERNET SITE AUTHENTICATION SERVICE

TECHNICAL FIELD

The field of the invention is that of checking the identity of a web site on the Internet, in particular verifying that the web site address has not been taken over by an imposter.

BACKGROUND OF THE INVENTION

There are millions of sites now on the Internet. Recently, the creators of some of these sites are perpetrating a certain type of fraud. In this fraud, a site masquerades as another site, typically a site engaged in e-commerce. The masquerader site has the same appearance as the authentic site, but its programming is different. The masquerader may simply pull business away from the authentic site, or it may capture personal information about a user for nefarious purposes. The information may be just the user's Internet address, or it may be obtained from the user via dialogs, and may include the user's credit card number, social security number or any such. The masquerade is facilitated through hijacking of some subset of the Internet's domain name service (DNS) that maps Universal Resource Locators (URLs) to Internet addresses. When DNS is hijacked it returns the address of the masquerader rather than the address of the legitimate site.

Increased assurance that a web site that the user is browsing is legitimate has value to both the user and to the operator of the site. If a user is reasonably confident that a web site is legitimate he or she will be more likely to supply that web site with personal or business information of value and to conduct business with that site.

U.S. Pat. No. 5,717,756 to Coleman addresses the problem of the authentication of one machine to another. That approach uses the generation of a unique machine-specific key. The problem of current concern is not machine-specific: any web server that serves legitimate content is of equal value to the end user, and changes in machine configuration do not affect this value.

In U.S. Pat. No. 5,953,424 Vogelesang et. al. a cryptographic protocol is described capable of "detection of prior occurrences of unauthorized parties successfully masquerading as an authorized party." This protocol requires modification of both the site and the user's browser to implement the protocol, while the subject invention requires no modification of the site.

Solutions to this fraud are known, but have drawbacks. In one solution, the end user comes into possession of a certificate from the site and validates that certificate, either locally or with a third party. Certificate validation locally adds to the complexity and cost of accessing the Internet. It does not apply if the user cannot or has not obtained the certificate, or if the user's computer has lost the certificate, as it might during a recovery process.

Third-party certificate validation adds a delay to the access to the desired site and may add a cost if the third party charges for validation. It is even possible for a site to spoof validation by registering with the third party, but subsequently to change its appearance and function and hijack DNS so as to masquerade as another legitimate site.

It is desirable for any solution to this problem to be implemented in a transparent way that is, without additional behavior that would be apparent to the end user. This is due, in part, to the fact that masquerading is infrequent, although highly disruptive when it exists.

A solution must not complicate the implementation of a legitimate site nor increase its resource requirements significantly.

It would be advantageous to users and site operators to be able to automatically differentiate between legitimate and masquerader sites, alerting the end user appropriately. This, in turn, increases the user's confidence that his or her transaction will be with a legitimate site and in so doing, increases the business potential of the Internet.

SUMMARY OF THE INVENTION

The invention relates to methods for the automatic detection of masquerading web sites and the alerting of an Internet user to that situation.

A feature of the invention is that the solution to this problem is implemented in a transparent way, without additional behavior that would be apparent to the end user.

A feature of the invention is software that runs on a personal computing device and a service that is provided via the Internet. The software on the personal computing device is in the form of a proxy, or transparent component in the Internet Protocol implementation. The proxy receives all outbound messages, analyzes them and forwards or modifies them without the user's intervention.

Another feature of the invention is an authentication server that performs a test on the target websites' IP address and behavior.

DETAILED DESCRIPTION

According to the invention, the authenticity of Internet sites is verified by a combination of software that runs on a personal computing device and a service that is provided via the Internet. The software on the personal computing device is in the form of a proxy, or transparent component in the Internet Protocol implementation. The proxy receives all outbound messages, analyzes them and forwards or modifies them without the user's intervention.

The proxy intercepts web site access requests and interacts with a web-based service to validate the web site that these requests are directed to. The service makes an assessment if the requests are to a legitimate web site. If they are, then they are either forwarded or the proxy is notified with an approval message that the requests can be sent directly. If the assessment is that the site is not legitimate, then the proxy is notified that the web site that would have been accessed is probably a masquerader.

In a preferred embodiment, the authentication service employs a combination of analyses of Internet addresses and site behavior. The service maintains knowledge equivalent to that of the Internet domain name resolution service for specific web sites known to be under masquerading attack.

If a domain name resolves to an Internet address different from that known to the service as being the legitimate site, this is an indication of a masquerade. The service also validates the web site by appearance and behavior. The static content of the web site's pages are checked; periodically the web site is challenged with a dummy transaction that may or may not be known to the legitimate web site, and any behavioral abnormalities noted as symptomatic of a masquerade.

Figure 1:
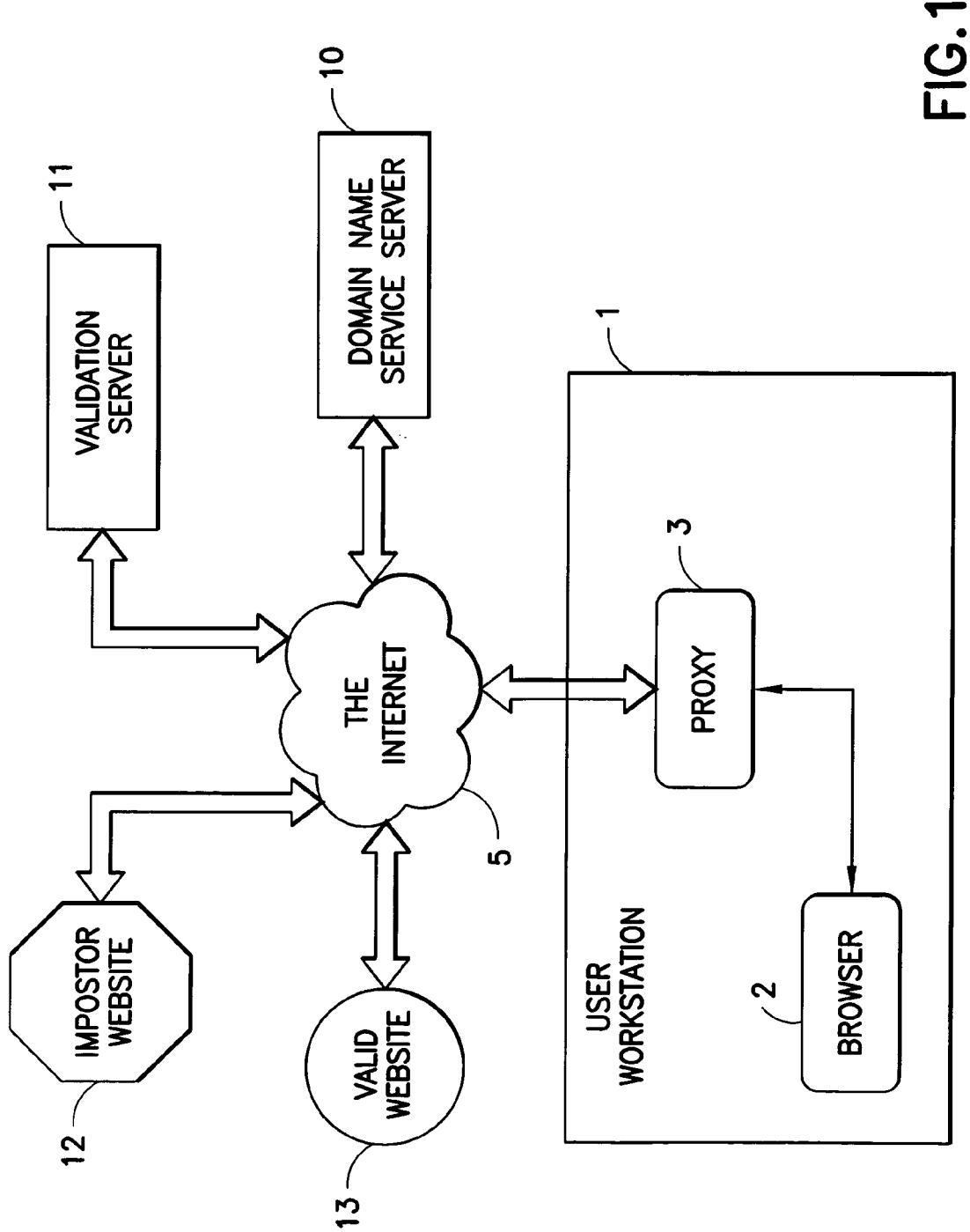
FIG. 1 shows an overall diagram of a system employing the method.

FIG. 1 shows the general disposition of the components of the subject invention. End user workstation 1 contains browser 2 and proxy 3, such that browser web site access requests are sent first to proxy 3 before being sent on to the Internet 5. Also shown in the Figure are one of possibly many domain name service (DNS) servers 10, validation server 11, impostor website server 12 and legitimate website server 13. In normal use, the end user uses user workstation 1 to access web sites on the Internet. The user invokes browser 2 and supplies the Universal Resource Locator (URL) for the web site.

Software in the user workstation (located e.g. in the proxy or, if arrangements have been made with the browser vendor, in the browser) accesses the DNS server 10 to resolve the URL's domain name component to an Internet Protocol (IP) address. In normal operation, DNS server 10 returns the IP address of valid website 13 to the user workstation 1 so that software in user workstation 1 (typically the browser) can then access valid website 13.

A site masquerade attack on valid website 13 typically consists of two components. First, impostor website 12 accesses valid website 13 to obtain copies of valid content, so that when impostor website 12 is accessed it will appear identical to valid website 13. Then, impostor website 12 attacks DNS server 10 to update its tables in such a way as to cause the domain name of the valid website 13 to be resolved invalidly to the IP address of the impostor website 12. The details of the imposter's methods change from time to time and are not part of the present invention, which is directed at thwarting imposters.

If the imposters's penetration is successful, attempted end user accesses to valid website 13 will resolve instead to impostor website 12; and, because impostor website 12 has duplicated content from valid website 13, the end user will not be warned by any unusual appearance or behavior.

With the subject invention, an access originating at browser 2 will access the DNS server 10 and resolve to the IP address of the impostor website 12 as before. However, in a system according to the invention, when the website access request is sent from user workstation 1 it will pass first to proxy 3, which will then contact validation server 11. As a first inquiry, proxy 3 will ask validation server 11: 1) if the domain name has resolved validly to the given IP address (of website 12) in the past, 2) if the IP address (website 12) is known to be that of an impostor website, or 3) if there are significant differences in behavior or appearance between data taken from valid website 13 and stored in validation server 11 and corresponding data taken from impostor website 12 (whether stored in server 11 or ascertained in response to this particular request). If the answer to alternative 1 is negative or the answer to either alternative 2 or 3 is positive, proxy 3 will notify the end user of user workstation 1 of the probable impostor.

In the preferred embodiment, the user is free to access website 12 after the warning.

Figure 2:
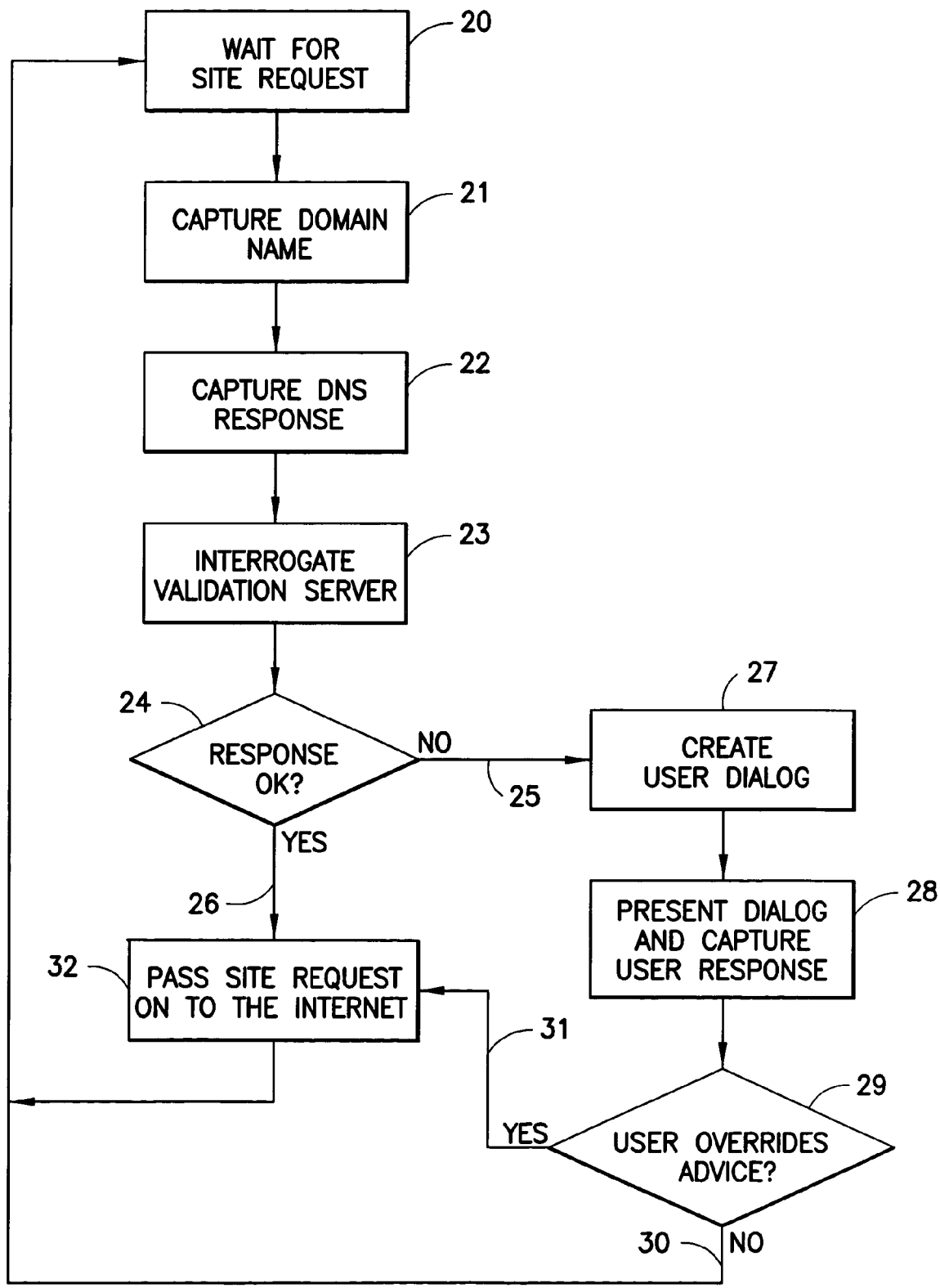
FIG. 2 shows steps in the proxy software.

FIG. 2 details the processing of proxy 3 of FIG. 1. In block 20, the proxy waits for a site request from the browser 2 of FIG. 1. When that request is received, it is not automatically sent on but is blocked, pending further processing by the proxy. In blocks 21 and 22, the domain name is captured, the DNS interrogated to obtain the resolved IP address, and the address is captured as well. Block 23 packages these values into a request to the Validation Server, shown as block 11 in FIG. 1.

The Validation Server receives and processes this request and replies in a manner to be described subsequently. In block 24 the response is received and analyzed to see if the Validation Server has discovered problems with the domain name mapping or with the site itself. If no problems are found, branch 26 is taken to block 32, which permits the site request blocked previously to be sent on to the Internet.

If the Validation Server finds problems, branch 25 is taken to block 27, which takes the Validation Server response and uses its contents to create a user dialog box. Block 28 then presents that dialog box to the end user and captures the end user's response. In the case in point, the dialog box asks the end user whether to abort the site request or to allow it to proceed.

This is not the only possible action, however. In other versions of the invention, the dialog box may ask the user if the request should be altered to the valid site, or to report a DNS error to the appropriate authorities, or may perform any other action consistent with the determination of problems in the site access request by the Validation Server.

As will be subsequently described, the Validation Server itself may take some actions when a site access request is detected to have problems.

If the user chooses to allow the site access to go forward, branch 31 is taken to block 32 whose function was formerly described. If the user chooses to abort the site access, branch 30 is taken to block 20, which then awaits a subsequent site access request.

Figure 3:
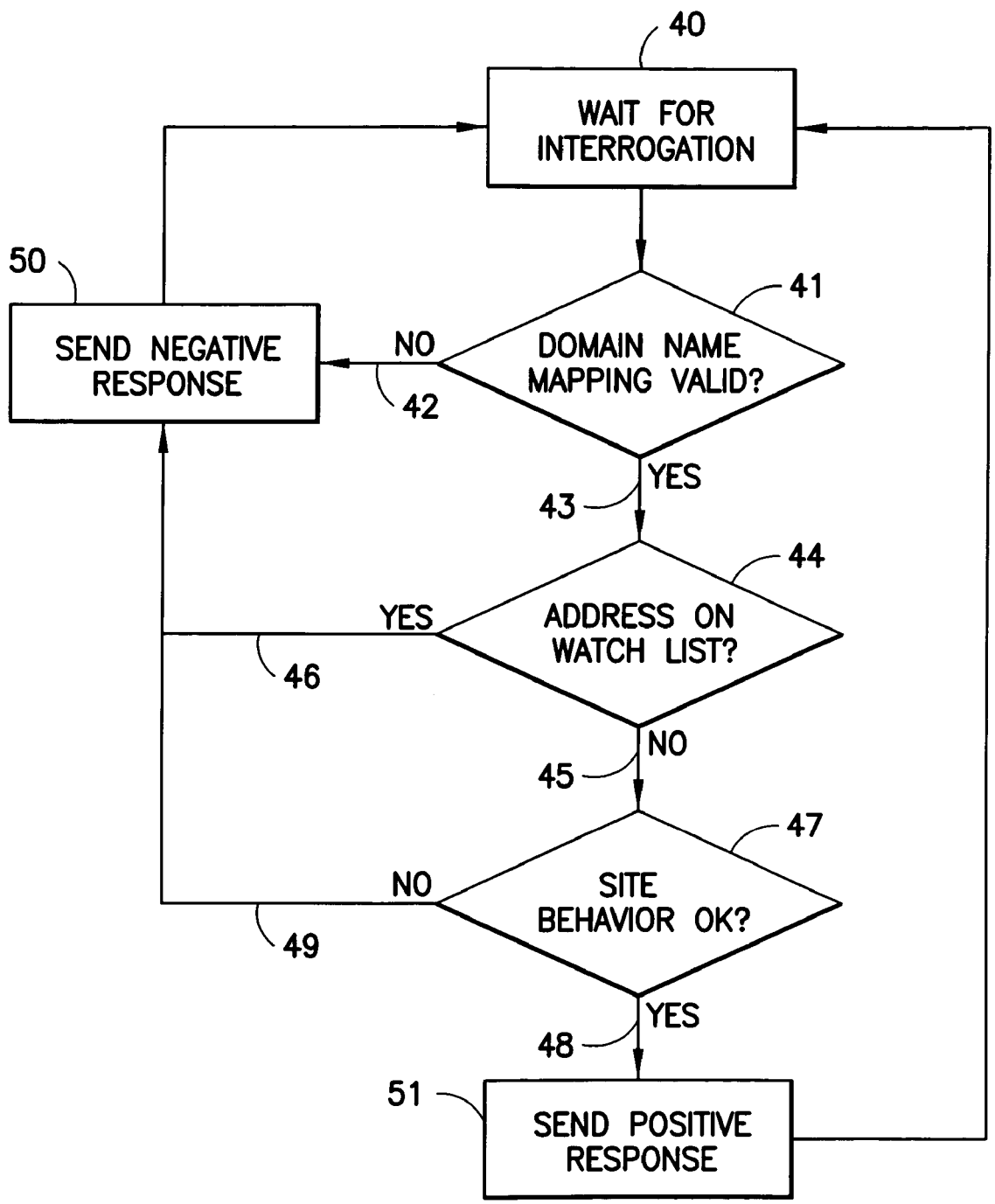
FIG. 3 shows steps in the validation server.

FIG. 3 details the logic flow of the Validation Server. The Validation server is preferably implemented as a Web Service. For details of Web Services, see the book Web Services by Ethan Cerami, O'Reilly and Associates, published February 2002, ISBN 0596002246.

In FIG. 3, processing starts with the receipt of an interrogation from an end user workstation, generated in block 23 of FIG. 2. The interrogation is received in block 40 of FIG. 3. A series of tests are performed on the information in the interrogation, the first of which is performed in block 41. In that block the pair consisting of a domain name and an Internet address is tested against a list of such pairs kept locally in the Validation Server. The maintenance of this list will be described subsequently. If the pair is not valid, branch 42 is taken to block 50, which sends a negative response to the interrogation. If it is valid, branch 43 is taken to block 44. Block 44 checks to see if the Internet address is on a watch list, maintained locally in the Validation Server. The maintenance of this list will be described subsequently. If the Internet address in the interrogation is on the watch list, branch 46 is taken to block 50 whose function has been previously described. If not, branch 45 is taken to block 47. Block 47 tests the status of the requested site, as maintained by the Validation Server. This test is conducted on the domain name of the site rather than on its Internet address, as a safeguard against the case that the Validation Server does not have a correct mapping of domain name and Internet address. This could occur if the domain name service used by the Validation Server has been successfully attacked. The test is performed using a list of domain names and their status maintained locally in the Validation Server. The maintenance of this list will be described subsequently.

If the test fails, branch 49 is taken to block 50, whose function has been previously described. If the test succeeds, branch 48 is taken to block 51, which sends a positive answer to the interrogation from the end user workstation. After a response is sent, whether positive or negative, block 40 is re-entered to await the next interrogation.

The list of pairs consisting of a domain name and an Internet address, maintained locally in the Validation Server, is used to validate an interrogation request from an end user workstation. Entries are created in this list typically when a site access request is received from a user workstation, and the domain name in the access request is not present in the list.

Typical processing in the Validation Server would be to contact one or more domain name servers to obtain Internet addresses for the domain name, and to check for agreement among the responses. If there is agreement or if there is substantial agreement the site would then be contacted. If the site supports certificate-based authentication the Validation Server would then authenticate the site and if it is found authentic a pair would be created and entered into the list.

Authenticity can also be estimated from historical data. If there is already a pair in the list, and if the Internet address obtained from the domain name service has changed, re-authentication would be done.

The watch list consists of a list of domain names and Internet addresses, maintained locally in the Validation Server. This list is used to check an interrogation request from an end user workstation. Entries are created in this list typically when a message is received from a recognized authority (e.g., government agency, Internet governance site) to the effect that a masquerade may be in progress for a particular website. An entry may also be made in this list when, in the process of checking an interrogation request, multiple distinct responses are encountered when accessing the domain name system of the Internet. The watch list may be shared with other instances of the Validation Server.

The status list consists of a list of domain names, each with an associated status. The status may be either OK, indicating that the site is behaving normally, or not OK, indicating that the site is behaving in a manner consistent with a masquerade. The status may also be uncertain, indicating that although behavior has been substantially normal, it is not now consistent with past behavior. The status may also be unknown, indicating that the behavior of the site has not been determined, or has been determined so long ago that it may no longer be valid. This list is maintained locally in the Validation Server.

The Validation Server determines site status with means including, but not limited to, static content verification, behavior verification, capacity verification, verification means agreed to with the site, or the exchange of certificates or other cryptographically encoded information with the site. Static content verification consists of typically retrieving web page content from a number of web pages of that site, sampling the received content (e.g., images, text), computing a hash code of that content and comparing the hash code with a previously-stored hash code. Behavior verification consists of typically filling out a web form and submitting it, possibly with intentional errors, and analyzing the resultant site behavior. Behavior verification can extend to the actual purchase of an item from the web site, while checking responses at each step. Preferably the item would be charged to a special account maintained by the website, such that no shipments would be made and no charges incurred. Capacity verification is a form of denial-of-service attack in which the Validation Server submits transactions at a high rate and verifies the website's ability to service these transactions. Capacity verification, while intrusive, depends on the likelihood that legitimate websites have much higher capacity than masqueraders.

Verification means agreed to with the site include the above-mentioned purchasing behavior, but may also include protocols known only to the legitimate website and to the Validation Server. Finally, the exchange of certificates or other cryptographically encoded information are well-known in the art and include IPSec and SSL.

The Validation Server may perform certain actions not shown in FIG. 3, including the automatic notification of appropriate authorities that a new masquerade may be occurring. The Validation Server may be one of a number of like servers maintained by the same service provider or by different service providers, such that a prior agreement exists among these service providers to exchange information relating to masquerades.

As masquerades are illegal, the Validation Server may be obligated to report potential masquerades to law enforcement agencies and possibly to Internet organizations concerned with fraud, such as the CERT Coordination Center at Carnegie-Mellon University.

It can be seen that the description given above provides a simple, but complete implementation of the automatic detection and foiling of a website masquerade. There may be a concern as to an attack that masquerades as a validation server 11 of FIG. 1. Such a masquerade could cause an impostor validation server to fail to identify an impostor website 12. Conventional techniques (e.g., Secure Sockets Layer—SSL) can be used to prevent such a masquerade, and only the real validation server 11 must implement SSL.

Alternatively, a private validation protocol based on certificate exchange or any other cryptographic or other technique could be used to protect against masquerades of the validation server 11.

The description provided enables many forms of service provision. In one form a service provider charges for each response from the Validation Server to a user workstation. In another form the Validation Server charges legitimate websites for services provided to end users for free.

Service providers may provide regionally specialized services or may specialize in certain classes of websites, and charging may be contingent on the degree of certainty that a particular website is legitimate.

In solving this problem, we rely on two characteristics of masqueraders: the fact that their Internet addresses are the same as the addresses of legitimate sites, and the probability that their behavior is not the same as that of legitimate sites.

Those skilled in the art will appreciate that the description above may be modified in some details. For example, the functions of proxy 3 may be located on a server maintained by an organization such as a corporation that has a firewall separating its internal net from the Internet. The local IT department may choose to centralize the functions of the proxy in the server that operates the firewall. Also, the functions of validation server 11 could be performed by a server controlled by an organization that employs the users, i.e. a private server as opposed to a server that accepts requests from any user.

Also, the functions of the proxy could be performed by a browser or by an Internet service provider. If desired, the user might maintain a list of authentic Internet addresses, so that the authentication process described above is not repeated for each access request. This list constitutes a client-side cache of the contents of the Validation Server. Client-side caching is known to those skilled in the art.

While the invention has been described in terms of a single preferred embodiment, those skilled in the art will recognize that the invention can be practiced in various versions within the spirit and scope of the following claims.

What is claimed is:

1. A method of processing a request for access to an Internet web site comprising the steps of:
    intercepting a web access request from a user containing an IP address of a target web site;
    directing the IP address to an authentication computer, said authentication computer comparing the behavior of a computer at said IP address of said target website with a criterion for acceptability, said criterion for acceptability verifying that the response capacity of said target website is greater than a threshold value;
    receiving a report from said authentication computer; and
    directing said web access request to said target website when said report is positive.

2. A method according to claim 1, further comprising a step of:
    directing an override request to said user; and
    directing said web access request to said target website when said user exercises an override option.

3. A method according to claim 1, further comprising a step of:
    directing said web access request to said target website when said report is positive without input from said user.

4. A method according to claim 1 further comprising a step of:
    comparing said IP address of said target website with a previously stored valid IP address.

5. A method according to claim 1, further comprising a step of:
    comparing said IP address of said target website with a list of suspect IP addresses.

6. A method according to claim 1, in which said step of comparing behavior of the computer at said IP address of said target website with a criterion for acceptability comprises comparing received data from said target website with corresponding stored data.

7. A method according to claim 6, in which said step of comparing behavior of the computer at said IP address of said target web site with a criterion for acceptability comprises sending incorrect data to said target website and comparing data received from said target website in response to said incorrect data with corresponding stored data.

8. A method according to claim 2, further comprising a step of:
    comparing said IP address of said target website with a previously stored valid IP address.

9. A method according to claim 2, further comprising a step of
    comparing said IP address of said target website with a list of suspect IP addresses.

10. A method according to claim 2, in which said step of comparing behavior of the computer at said IP address of said target website with a criterion for acceptability comprises comparing received data from said target website with corresponding stored data.

11. A method according to claim 2, in which said step of comparing behavior of the computer at said IP address of said target website with a criterion for acceptability comprises sending incorrect data to said target website and comparing data received from said target website in response to said incorrect data with corresponding stored data.

12. A system for enabling a user browser device remote access to an Internet web site comprising:
    a first server means for intercepting a web access request from the user containing an IP address of a target web site;
    a second server means for directing the IP address to an authentication computer;
    said user browser device for receiving a report from said authentication computer and
    for directing said web access request to said target website when said report is positive,
    wherein the authentication computer compares the behavior of a computer at said IP address of said target website with a criterion for acceptability, said criterion for acceptability verifying that the response capacity of said target website is greater than a threshold value.

13. A system according to claim 12, in which said first server means for intercepting a web access request and said second server means for directing said web access request to said target website are located within the workstation of an individual user.

14. A system according to claim 12, in which said first server means for intercepting a web access request and said second server means for directing said web access request to said target website are located centrally in a network containing a plurality of workstations of individual users.

15. A computer program storage device, readable by machine, tangibly embodying a program of instructions executable by a machine for accessing an Internet web site, said instruction performing the steps of:
    intercepting a web access request from a user containing an IP address of a target web site;
    directing the IP address to an authentication computer, said authentication computer comparing the behavior of a computer at said IP address of said target website with a criterion for acceptability, said criterion for acceptability verifying that the response capacity of said target website is greater than a threshold value;
    receiving a report from said authentication computer; and
    directing said web access request to said target website when said report is positive.

16. The computer program storage device according to claim 15, further comprising a step of:
    directing an override request to said user; and directing said web access request to said target website when said user exercises an override option.

17. The computer program storage device according to claim 15, further comprising a step of:
    directing said web access request to said target website when said report is positive without input from said user.

18. A computer program storage device, readable by machine, tangibly embodying a program of instructions executable by a machine for accessing an Internet web site, said instruction performing the steps of:
    receiving from a user the IP address of a target web site in an authentication computer;
    testing a target web site;
    sending a report to said user;
    wherein, the step of testing a target website further includes the sub-step of comparing the behavior of a computer at said IP address of said target web site with a criterion for acceptability, said criterion for acceptability verifying that the response capacity of said target website is greater than a threshold value.

19. The computer program storage device according to claim 18, wherein, the step of testing a target website further includes the sub-step:
   comparing said IP address of said target website with a previously stored valid IP address.

20. The computer program storage device according to claim 18, wherein, the step of testing a target website further includes the sub-step of:
   comparing said IP address of said target website with a list of suspect IP addresses.

21. The computer program storage device according to claim 18, wherein, the step of testing a target website further includes the sub-step of of comparing behavior of the computer at said IP address of said target website with a criterion for acceptability comprises comparing received data from said target website with corresponding stored data.

22. The computer program storage device according to claim 21, in which said step of comparing behavior of the computer at said IP address of said target website with a criterion for acceptability comprises sending incorrect data to said target website and comparing data received from said target website in response to said incorrect data with corresponding stored data.

* * * * *